United States Patent [19]
Belfatto et al.

[11] Patent Number: 5,621,561
[45] Date of Patent: Apr. 15, 1997

[54] LASER SCANNER INCORPORATING VARIABLE FOCUS MECHANISM FOR RAPIDLY CHANGING BEAM SPOT SIZE

[75] Inventors: Robert V. Belfatto, Melbourne Beach; Gregory O. Makhov, Orlando; William R. Benner, Jr., Ormond Beach, all of Fla.

[73] Assignee: NEOS Technologies, Inc., Melbourne, Fla.

[21] Appl. No.: 339,501

[22] Filed: Nov. 14, 1994

[51] Int. Cl.$^6$ .................................................. G02B 26/08
[52] U.S. Cl. .......................... 359/205; 359/201; 359/202; 359/208; 359/212; 359/213; 359/214; 359/215; 359/219
[58] Field of Search ...................................... 359/196–198, 359/201–202, 205, 208, 212–217, 219, 223, 726–731, 840, 850, 855, 862–863, 865, 872; 250/234–236; 235/462, 467, 470; 347/255–260, 252; 355/56–57, 60; 358/474, 296, 302

[56] References Cited

U.S. PATENT DOCUMENTS

| | | | |
|---|---|---|---|
| 4,060,322 | 11/1977 | Hirayama et al. | 355/60 |
| 4,167,024 | 9/1979 | Hamisch | 235/462 |
| 4,797,551 | 1/1989 | Ferrante | 235/467 |

*Primary Examiner*—James Phan

[57] ABSTRACT

An apparatus for rapidly varying the spot size of a scanned imaging laser beam comprises a focusing device (e.g. focussing and collimating lens arrangement) and a beam displacement control device (e.g. a rotary actuator scanner mirror or linear actuator). The beam displacement control device is operative to cause relative displacement between the laser beam and a selected one of a plurality of reflector element positions. Respective ones of the plurality of reflector positions are located at respectively different separation distances from the focusing device. As a result, in the course of traveling along an laser beam path, the laser beam is incident upon the focusing device and the reflector element, so as to be directed to a given spatial location along the path, whereby the laser beam has a resultant beam width that is dependent upon the separation distance between the selected reflector element position and the focusing device.

17 Claims, 2 Drawing Sheets

LASER SCANNER INCORPORATING VARIABLE FOCUS MECHANISM FOR RAPIDLY CHANGING BEAM SPOT SIZE

FIELD OF THE INVENTION

The present invention relates in general to optical scanning apparatus and is particularly directed to an apparatus for scanning a laser beam, the spot size of which can be rapidly varied by an adjustable focus/defocus mechanism.

BACKGROUND OF THE INVENTION

Present day image reproduction systems, such as those employed in the entertainment industry, where large multicolor images may be recreated on a variety of image reproduction media, commonly employ one or more laser scanning devices to scan a modulated laser beam across an image projection surface. For optimal control of image reproduction, it is desirable to change the spot size (beam width) of the imaging laser beam and thereby the thickness of a line being imaged onto the reproduction surface. In the past, in order to vary line thickness, it was customary practice to rescan the beam across the imaging medium, with each subsequent scan being slightly offset from a previous scan, thereby widening or thickening the imaged line. Unfortunately, such a technique is extremely slow and detracts from the objective of rapidly displaying an image to a viewing audience.

One proposal to solve this problem, described in the U.S. patent to M. Razzaghi, No. 5,274,492, entitled: "Light Spot Size and Shape Control for Laser Projector," involves the use of a flexible or deformable mirror to change the focus or spread of the scanning beam. Unfortunately, because the principal component employed in this system, the mirror element, is subjected to repetitious physical flexing and heating by the incident beam, it soon develops internal stresses, which not only modify the intended shape of the mirror, but limit its useful life. In addition, because of the heat-induced stress problem, such a scheme is limited to use with only relatively low energy lasers.

SUMMARY OF THE INVENTION

In accordance with the present invention, the requirement to rapidly vary the spot size of a scanned imaging laser beam is successfully addressed, without suffering from the physical limitations of the above-described flexing mirror system, by means of a reflector translation device that is operative to controllably displace an optical beam reflector (e.g. a rotary actuator scanner mirror) over a relatively short distance that is sufficient to change the effective travel path of the beam such that the focus of the beam and thereby its resulting spot size is rapidly changed.

Pursuant to a first embodiment of the present invention, an acousto-optic modulator imparts color and intensity modulation to a laser beam. Disposed in the travel path of the beam is a broadband polarizing, beamsplitter cube, which causes the first order beam output by the acousto-optic modulator to become horizontally polarized, so that the beam passes through the beamsplitter and is converted into circular polarization by an achromatic quarterwave retarder element. This circularly polarized beam is then focused by a focussing lens. The focussed beam is incident upon a scanned or rotated mirror of a closed loop rotary actuator scanner, which causes the mirror to rapidly translate the focussed beam onto a selected one of a plurality of retro-reflectors. The retro-reflectors are disposed at varying distances from the focusing lens.

After being focussed by the rotary actuator scanner mirror onto a selected retro-reflector, the beam is reflected back through the focussing lens. If the distance between the selected retro-reflector and the lens is unity focal length, there is no change in the diameter of the beam and the beam is recollimated by the focussing lens. However, a retro-reflector located at a distance less than its focal length F1 causes the focussing lens to produce a diverging beam, thereby changing its spot size.

After returning through the focussing lens, the beam passes through the quarterwave retarder element, converting it back to linearly polarized light with vertical orientation. The beam is then incident upon and is reflected by the beamsplitter cube. The combination of quarterwave retarder and the beamsplitter cube serves as an achromatic optical isolator, allowing the entrance and exit beams to be separated from each other. The exit beam is then directed by a mirror unit to an XY scanner assembly, which scans the beam, whose spot size is variable, over an image projection surface.

Pursuant to a second embodiment of the present invention, a closed loop rotary actuator scanner is used to select one of several optical paths of varying length. In the second embodiment, rather than employ the beam reentrant system of the first embodiment, a rotary actuator scanner has a double sided mirror positioned such that an entrance beam traveling along a beam entry path and incident upon a first focusing lens reflects from a first side of the mirror. After reflecting from additional mirrors, the focussed, exit beam reflects from a second, opposite side of the rotary actuator scanner mirror. Focussing lenses upstream and downstream of the rotary actuator scanner mirror form a matched entrance and exit lens pair that are operative to focus and collimate the beam.

The front side of the rotary actuator scanning mirror, the mirrors of the mirror array and the fixed reflectors, together with the back side of the scanning mirror form respectively different triangular geometries, each of which serves to translate the beam from the output angle to the conjugate input angle. As in the first embodiment, the closed loop rotary actuator scanner serves to rapidly scan the focussed beam upon a selected one of a plurality of mirror reflectors of the mirror array, which are disposed at varying distances from the scanner.

Like the first embodiment, if the total distance from the entrance lens along the triangular beam travel path to the exit lens is unity focal length, there is no change in the diameter of the beam and is the beam is merely recollimated by the exit lens. However, any other triangular travel path distance will cause the exit lens to produce a diverging beam, thereby changing the beam's spot size.

Advantages of the second embodiment include the elimination of broadband optical isolators and a potential increase in efficiency. However, because of the additional geometry path considerations, the triangular arrangement is optically more complex and requires more alignment. The second embodiment may be modified by replacing the plane mirrors in the offset triangular path with spherical mirrors, thereby forming an asymmetrical telescope or down collimator. By proper selection of spherical mirror focal length, and appropriate spacing of the mirrors from the entrance lens, the exit lens may be omitted. Conversely, by proper selection of spherical mirror focal length, and appropriate spacing of the mirrors from the exit lens, the entrance lens may be omitted.

As a further variation, a series of miniature lenses may be employed in place of the spherical mirrors.

Rather than use a rotary actuator scanner to rapidly translate the length of the travel path of the beam onto one or more focussing elements, a linearly variable focussing system having a spherical mirror mounted to a linear actuator, such as a voice coil actuator, piezoelectric translator, or magnetostrictive translator, may be used in a third embodiment of the invention. As in the first embodiment, an input beam is incident upon a broadband polarizing, beamsplitter cube, which causes the first order beam to be horizontally polarized and incident upon an achromatic quarterwave retarder element, which converts the linearly polarized input light beam into circular polarization. The circularly polarized beam at the output of quarterwave retarder element is focused by a focussing lens having a short focal length lens (e.g. on the order of 1 cm or less) onto a matched spherical mirror located at distance of 2 F from the focussing lens. Linear translation of the spherical mirror by means of the linear actuator toward or away from the focussing lens focuses or defocuses the beam.

An advantage of the third embodiment is that it achieves a very compact, easy to use optical system. Linear variable focus permits any spot size in the range to be accessed. Spot size can track a linear function, such as a linear waveform. Tracking spot size to a linear function is desirable for depth cueing applications, where the z-axis signal varies the spot size dynamically. Each of the embodiments of the invention is capable of focussing/defocussing a multiwavelength laser beam over a range of 1 to 50 milliradians, with access speeds in excess of 100 hertz, and may be used with high irradiance sources, up to 500 W/cm².

DETAILED DESCRIPTION

Figure 1:
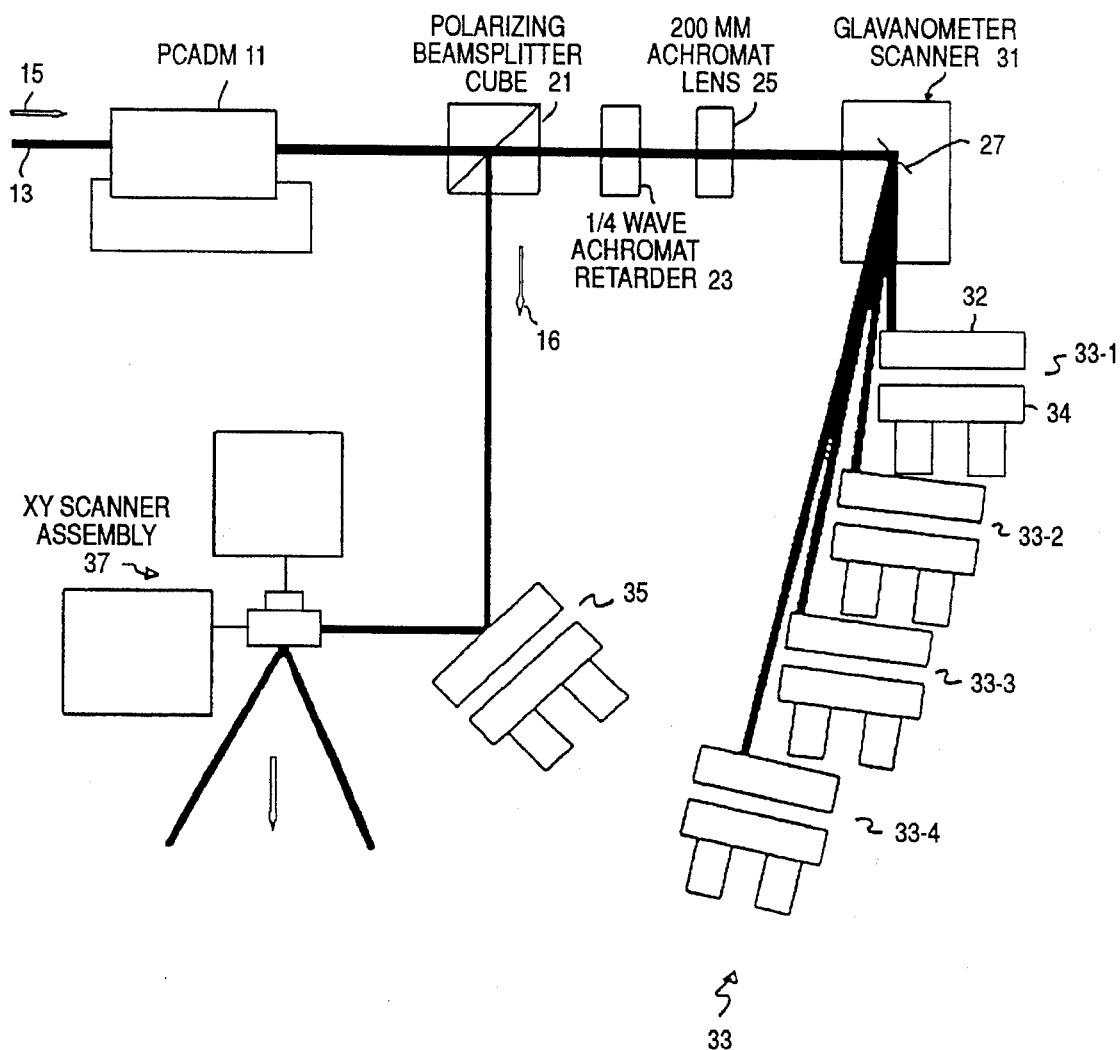
FIG. 1 diagrammatically illustrates a first embodiment of the present invention in which a focussed beam traverses a return (retro-reflected) travel path off a rotary actuator scanner mirror.

Before describing in detail the new and improved laser scanning apparatus in accordance with the present invention, it should be observed that the invention resides primarily in what is effectively a beam focus adjustment mechanism, that is incorporated within the output path of a collimated laser source. The source of the laser beam itself and the scanning device components per se are unaffected by the focus adjustment mechanism and, per se, are not considered part of the invention. Consequently, the manner in which the present invention is integrated in the optical path of the scanning elements of the overall system have been illustrated in the drawings in readily understandable block diagram format, which show only those specific details that are pertinent to the present invention, so as not to obscure the disclosure with details which will be readily apparent to those skilled in the art having the benefit of the description herein. Thus, the block diagram illustrations are primarily intended to illustrate the major components of the system in a convenient functional grouping, whereby the present invention may be more readily understood.

Referring now to FIG. 1, a first embodiment of the present invention is diagrammatically illustrated as comprising an acousto-optic modulator 11, which is operative to impart color and intensity modulation to an incident laser beam 13 travelling along a laser beam travel path 15. Disposed in travel path 15 is a broadband polarizing, beamsplitter cube 21. The first order beam output by modulator 11 is horizontally polarized, so that it passes through beamsplitter 21 and is incident upon an achromatic quarterwave retarder element 23, which converts the linearly polarized light beam to into circular polarization. In lieu of using a separate beamsplitter and achromatic quarterwave retarder element, an integrated polarizing beamsplitter/waveplate optical isolator may be employed. This circularly polarized beam at the output of quarterwave retarder element 23 is then focused by a focussing lens 25. (As a non-limiting example, lens 25 may comprise a 200 mm focal length lens.)

The beam output of lens 25 is incident upon a mirror 27 of a closed loop rotary actuator scanner 31 to rapidly scan the focussed beam upon a selected one of a plurality of retro-reflectors 33, four of which 33-1, 33-2, 33-3, 33-4 are shown as a non-limiting example. Retro-reflectors 33 are disposed at varying distances from focusing lens 25, with the farthest retro-reflector 33-4 being located at unity focal length F1. Each retro-reflector 33 consists of a plane mirror 32 mounted on an adjustable mirror mount 34.

In an alternative configuration, the plurality of discrete mirror mounts 34 may be replaced with unitary precision machined optical structure, resembling a curved ruled diffraction grating, in which each of a plurality of 'step' portions serves as a respective retro-reflector, thereby providing a plurality of beam sizes. As a further variation, spherical mirrors may be installed in place of plane mirrors for the retro-reflectors 33. In such a modification, mirror focal length is made proportional to distance from the lens 25. The resulting architecture would constitute a variable down-collimator, where divergence increases proportionally to decrease in beam diameter.

After being focussed by rotary actuator scanner mirror 27 onto a selected one of the four retro-reflectors 33, the beam is reflected back through the lens 25. If the distance between the selected retro-reflector 33-i and the lens 25 is unity focal length (as would be the case if the rotary actuator mirror were rotated to a reflecting position to bring the beam into incidence upon retro-reflector 33-4), there is no change in the diameter of the beam and is the beam simply recollimated by lens 25. On the other hand, a retro-reflector located at a distance less than F1 (one of retro-reflectors 33-1, 33-2, 33-3 in the illustrated example) will cause lens 25 to produce a diverging beam. The illustrated example provides a selection of four spot sizes having a diameter range on the order of eight to one.

After returning through lens 25, the beam passes again through quarterwave retarder element 23, converting it back to linearly polarized light with vertical orientation. The beam is then incident upon and is reflected by beamsplitter cube 21 along travel path 16. The combination of quarterwave retarder 23 and cube 21 serves as an achromatic optical isolator, allowing the entrance and exit beams to be separated from each other. The exit beam 16 is then directed by a mirror unit 35 to an XY scanner assembly 37.

Figure 2:
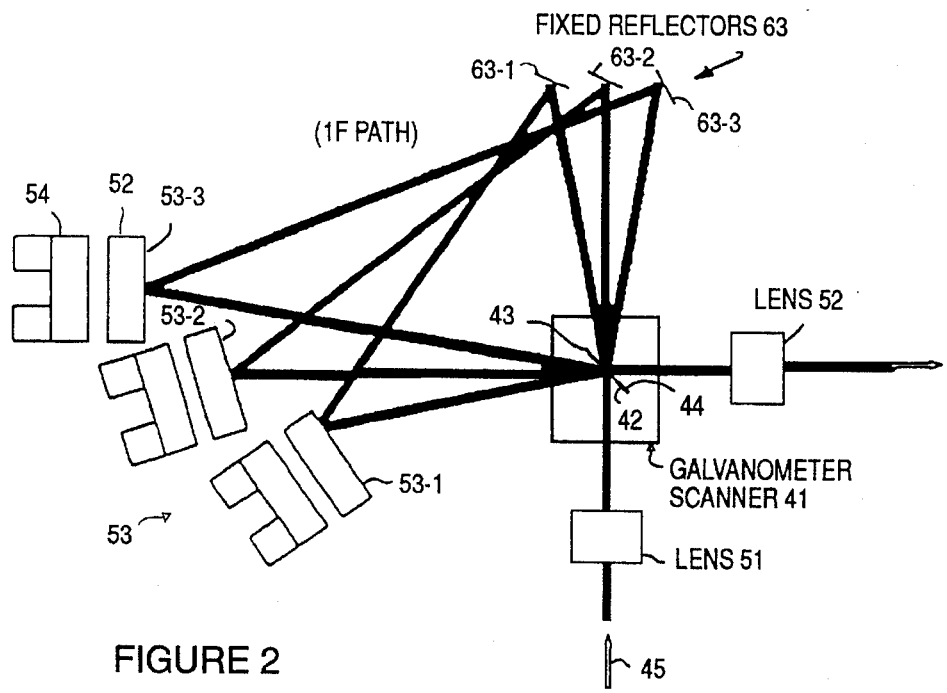
FIG. 2 diagrammatically illustrates a second embodiment of the present invention, in which a focussed beam traverses a triangular travel path off front and rear surfaces of a rotary actuator scanner mirror.

FIG. 2 diagrammatically illustrates a second embodiment of the present invention, which also uses a closed loop rotary actuator scanner to select one of several optical paths of varying length. In this embodiment, rather than employ the beam reentrant system of the embodiment of FIG. 1, a rotary actuator scanner 41 has a double sided mirror 43, positioned such that an entrance beam traveling along a beam entry path 45 and incident upon a first focusing lens 51 reflects from a first side 42 of mirror 43; after reflecting from additional mirrors, the focussed, exit beam reflects from a second, opposite side 44 of rotary actuator scanner mirror 43.

An array 53 of mirrors 55 positioned optically downstream of rotary actuator scanner 41 is operative to direct the focused beam that has reflecting off the first side 42 of mirror 43 to one of the mirrors of a set of fixed reflectors 63. From a respective one of fixed reflectors 63, the beam is directed to the second side 44 of rotary actuator scanner mirror 43. From the second reflector side 44 of mirror 43, the beam is then directed into a second focussing lens 52. Focussing lenses 51 and 52 form a matched entrance and exit lens pair that are operative to focus and collimate the beam.

The front side 42 of mirror 43, respective ones of the mirrors of mirror array 53 and those of fixed reflectors 63, together with the back side 44 of mirror 43 form respectively different triangular geometries, each of which serves to translate the beam from the output angle to the conjugate input angle. Such an offset triangular geometry, with the rotary actuator scanner mirror 43 at the apex, is commonly employed for parallax type blanking.

As in the first embodiment, the closed loop rotary actuator scanner 41 serves to rapidly scan the focussed beam upon a selected one of a plurality of mirror reflectors of mirror array 53, three of which 53-1, 53-2, 53-3 are shown as a non-limiting example. Reflectors 53 are disposed at varying distances from scanner 41, with the farthest reflector 53-3 being located at unity focal length F1. Like the first embodiment, each reflector 53 may comprise a plane mirror 52 mounted on an adjustable mirror mount 54.

After being directed by rotary actuator scanner mirror 43 onto a selected one of the three mirrors 53-1, 53-2, 53-3, and an associated one of the reflectors 63-1, 63-2, 63-3 of reflector array 63, the beam is reflected from the back side 44 of rotary actuator mirror 43 through second focussing lens 52. As described above, focussing lenses 51 and 52 provide a matched entrance and exit lens pair that focus and collimate the beam.

In operation, similar to the first embodiment, if the total distance from lens 51 along the triangular beam travel path to lens 52 is unity focal length, there is no change in the diameter of the beam and is the beam simply recollimated by lens 52. However, any other triangular travel path distance will cause lens 52 to produce a diverging beam.

Advantages of the embodiment of FIG. 2 include the elimination of broadband optical isolators (which are costly), and a potential increase in efficiency. However, because of the additional geometry path considerations, the triangular arrangement of FIG. 2 is optically more complex than the embodiment of FIG. 1, and requires more alignment.

The embodiment of FIG. 2 may be modified by replacing the plane mirrors 53 and 63 used in the offset triangular path with spherical mirrors, thereby forming an asymmetrical telescope or down collimator. By proper selection of spherical mirror focal length, and appropriate spacing of the mirrors from entrance lens 51, exit lens 52 may be omitted. By the same token, by proper selection of spherical mirror focal length, and appropriate spacing of the mirrors from exit lens 52, entrance lens 51 may be omitted. As a further additional variation of such a modified embodiment, a series of miniature lenses may be employed in place of the spherical mirrors, which will realize the same optical result.

Figure 3:
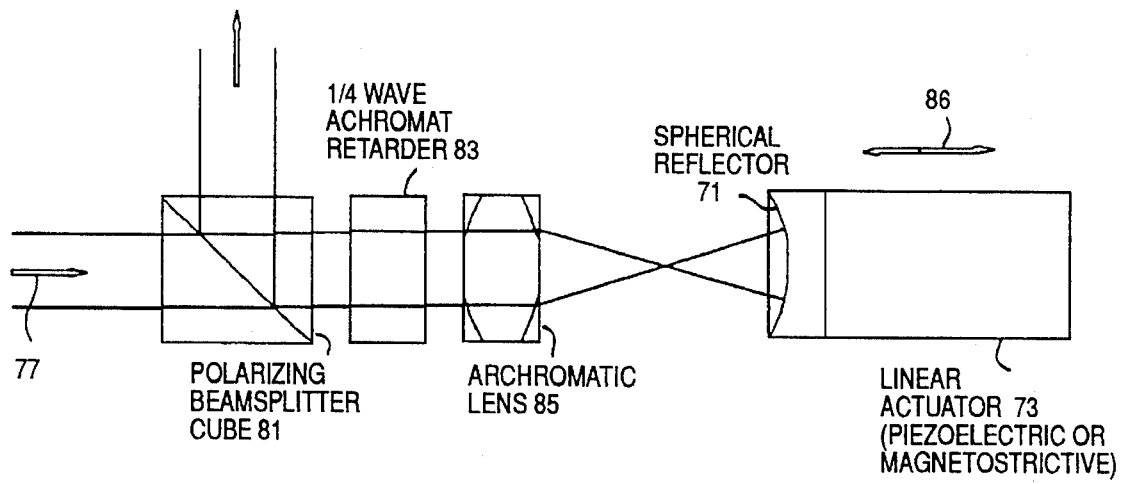
FIG. 3 diagrammatically illustrates a third embodiment of the present invention, in which a focussed beam traverses a return travel path off a linear actuator-controlled focussing mirror.

FIG. 3 diagrammatically illustrates a third embodiment of the present invention, which uses a linearly variable focussing system having a spherical mirror 71 mounted to a linear actuator 73, such as a voice coil actuator, piezoelectric translator, or magnetostrictive translator. Similar to the first embodiment, an input beam travelling along beam path 77 encounters a broadband polarizing, beamsplitter cube 81. The first order beam is horizontally polarized, so that it passes through beamsplitter cube 81 and is incident upon an achromatic quarterwave retarder element 83, which converts the linearly polarized input light beam into circular polarization. (As noted earlier, in place of a separate beamsplitter and achromatic quarterwave retarder element, an integrated polarizing beamsplitter/waveplate optical isolator may be employed). The circularly polarized beam at the output of quarterwave retarder element 83 is focused by a focussing lens 85 having a short focal length lens (e.g. on the order of 1 cm or less) onto matched spherical mirror 71 located at distance of 2 F from lens 85. Linear translation of spherical mirror 71 by linear actuator 73 (toward or away from lens 85 as denoted by double arrow 86) focuses or defocuses the beam. The range of translation of mirror 71 may be one the order of 1–2 millimeters.

As described above, examples of linear actuators for achieving linear translation of mirror 71 include, but are not limited to a voice coil actuator, a piezoelectric translator, or a magnetostrictive translator. Although a voice coil is probably the least expensive, and has the slowest performance. A magnetostrictive element provides the highest performance, but is expensive. If a piezoelectric element is used, a high voltage power supply must be employed.

An advantage of the embodiment of FIG. 3 is that a very compact, easy to use optical system is achieved. Linear variable focus permits any spot size in the range to be accessed. Spot size can track a linear function, such as a linear waveform, which the embodiments of FIGS. 1 and 2 cannot. Tracking spot size to a linear function is desirable for depth cueing applications, where the z-axis signal varies the spot size dynamically. As noted above, because of its high speed performance, a magnetostrictive element may achieve the highest speed, with bandwidths in excess of 1 kHz.

Experimental variation of the defocusing beam of the foregoing embodiments has revealed that the variation of intensity as a function of beam diameter becomes more readily apparent when a range of greater than 10:1 is used. Moreover, when the resultant beam is deflected (as with laser vector graphics), variations in intensity as a function of relative velocity become more apparent with the lower irradiance, large spot size. At 50 milliradians divergence, this characteristic is clearly discernable, and requires compensation.

To correct these problems, two factors were considered: 1) the level of defocus, and 2) the vector velocity of the scanning beam. The intensity signal controlling the emitted power is multiplied by a correction factor consisting of the defocus signal (larger-brighter, smaller-dimmer), and a portion of the velocity signal divided by the focus signal (faster-brighter, slower-dimmer). The velocity signal has no effect at minimum spot size, and increases to a factor of four at maximum spot size. This provides compensation for the additional dwell time typically involved in vector graphics applications at the end of a stroke.

The foregoing embodiments are capable of focussing/defocussing a multiwavelength laser beam over a range of 1 to 50 milliradians, with access speed in excess of 100 hertz, and may be used with high irradiance sources, up to 500 W/cm$^2$.

As will be appreciated from the foregoing description, the requirement to rapidly vary the spot size of a scanned imaging laser beam is successfully addressed by the focusing/defocusing mechanism of the present invention, which does not suffer from the physical limitations of the above-described prior art flexing mirror system. Through the use of a reflector translation device, the invention is operative to controllably displace an optical beam reflector (e.g. a rotary actuator scanner mirror or linear actuator) over a relatively short distance that is sufficient to change the effective travel path of the beam such that the focus of the beam and thereby its resulting spot size is rapidly changed.

While we have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A method of controlling the beam width of an optical beam comprising the steps of:

(a) directing said optical beam along a path that intersects a focusing device having a prescribed focal length; and (b) causing relative displacement between said optical beam and a selected one of a plurality of reflector positions at which a reflector element may be provided, respective ones of said plurality of reflector positions being located at respectively different separation distances from said focusing device, so as to cause said optical beam to be reflected from a reflector element provided at said selected one of said plurality of reflector positions, whereby, in the course of traveling along said path, said optical beam is incident upon said focusing device and said reflector element so as to be directed thereby to a given spatial location along said path, with said beam having a resultant beam width that is dependent upon the separation distance between said selected one of said plurality of reflector positions and said focusing device; and wherein said step (b) comprises arranging said plurality of reflector elements at respectively different separation distances and spatial orientations from a scanning reflector device that is spaced apart along said path from said focusing element, and causing said scanning reflector device to displace said optical beam such that it is incident upon and is reflected by a selected one of said reflector elements, and wherein said reflector elements comprise retro-reflector elements, so that, as said scanning reflector device displaces said optical beam to be incident upon and reflected by a selected one of said retro-reflector elements, said optical beam is returned to and reflected by a scanning reflector device to said focusing device.

2. A method of controlling the beam width of an optical beam comprising the steps of:

(a) directing said optical beam along a path that intersects a focusing device having a prescribed focal length; and (b) causing relative displacement between said optical beam and a selected one of a plurality of reflector positions at which a reflector element may be provided, respective ones of said plurality of reflector positions being located at respectively different separation distances from said focusing device, so as to cause said optical beam to be reflected from a reflector element provided at said selected one of said plurality of reflector positions, whereby, in the course of traveling along said path, said optical beam is incident upon said focusing device and said reflector element so as to be directed thereby to a given spatial location along said path, with said beam having a resultant beam width that is dependent upon the separation distance between said selected one of said plurality of reflector positions and said focusing device; and wherein said step (b) comprises causing said optical beam, after being reflected from said reflector element, to be again directed upon said focusing device and pass a polarizing beam-splitter and a quarter wave retarding device.

3. A method of controlling the beam width of an optical beam comprising the steps of:

(a) directing said optical beam along a path that intersects a focusing device having a prescribed focal length; and (b) causing relative displacement between said optical beam and a selected one of a plurality of reflector positions at which a reflector element may be provided, respective ones of said plurality of reflector positions being located at respectively different separation distances from said focusing device, so as to cause said optical beam to be reflected from a reflector element provided at said selected one of said plurality of reflector positions, whereby, in the course of traveling along said path, said optical beam is incident upon said focusing device and said reflector element so as to be directed thereby to a given spatial location along said path, with said beam having a resultant beam width that is dependent upon the separation distance between said selected one of said plurality of reflector positions and said focusing device; and wherein said step (b) comprises arranging said plurality of reflector elements at respectively different separation distances and spatial orientations from a scanning reflector device that is spaced apart along said path from said focusing element, and causing said scanning reflector device to displace said optical beam such that it is incident upon and is reflected by a selected one of said reflector elements, said reflector elements comprise a first plurality of reflector elements arranged at first respectively different separation distances and spatial orientations from said scanning reflector device, and a second plurality of reflector elements spaced apart from said first plurality of reflector elements and arranged at second separation distances and having second different spatial orientations from said scanning reflector device, so that as said scanning reflector device displaces said optical beam, said optical beam is reflected thereby along a path that intersects a selected one of said first plurality of reflector elements, a selected one of said second plurality of reflector elements, and is returned to and reflected by said scanning reflector device, and wherein said step (a) comprises directing said optical beam along a path that passes through a first focusing lens, and wherein step (b) comprises causing said optical beam to impinge upon a focusing reflector element.

4. A method of controlling the beam width of an optical beam comprising the steps of:

(a) directing said optical beam along a path that intersects a focusing device having a prescribed focal length; and (b) causing relative displacement between said optical beam and a selected one of a plurality of reflector positions at which a reflector element may be provided, respective ones of said plurality of reflector positions being located at respectively different separation distances from said focusing device, so as to cause said optical beam to be reflected from a reflector element provided at said selected one of said plurality of reflector positions, whereby, in the course of traveling along said path, said optical beam is incident upon said focusing device and said reflector element so as to be directed thereby to a given spatial location along said path, with said beam having a resultant beam width that is dependent upon the separation distance between said selected one of said plurality of reflector positions and said focusing device; and wherein said step (b) comprises arranging said plurality of reflector elements at respectively different separation distances and spatial orientations from a scanning reflector device that is spaced apart along said path from said focusing element, and causing said scanning reflector device to displace said optical beam such that it is incident upon and is reflected by a selected one of said reflector elements, said reflector elements comprise a first plurality of reflector elements arranged at first respectively different separation distances and spatial orientations from said scanning reflector device, and a second plurality of reflector elements spaced apart from said first plurality of reflector elements and arranged at second separation distances and having second different spatial orientations from said scanning reflector device, so that as said scanning reflector device displaces said optical beam, said optical beam is reflected thereby along a path that intersects a selected one of said first plurality of reflector elements, a selected one of said second plurality of reflector elements, and is returned to and reflected by said scanning reflector device, and wherein step (a) comprises providing a focusing lens optically downstream of said selected reflector element, said selected reflector element being a focusing reflector element, and wherein step (b) comprises causing said optical beam to impinge upon said focusing reflector element and reflected thereby to become incident upon said focusing lens.

5. A method of controlling the beam width of an optical beam comprising the steps of:

(a) directing said optical beam along a path that intersects a focusing device having a prescribed focal length; and (b) causing relative displacement between said optical beam and a selected one of a plurality of reflector positions at which a reflector element may be provided, respective ones of said plurality of reflector positions being located at respectively different separation distances from said focusing device, so as to cause said optical beam to be reflected from a reflector element provided at said selected one of said plurality of reflector positions, whereby, in the course of traveling along said path, said optical beam is incident upon said focusing device and said reflector element so as to be directed thereby to a given spatial location along said path, with said beam having a resultant beam width that is dependent upon the separation distance between said selected one of said plurality of reflector positions and said focusing device; and wherein said step (b) comprises arranging said plurality of reflector elements at respectively different separation distances and spatial orientations from a scanning reflector device that is spaced apart along said path from said focusing element, and causing said scanning reflector device to displace said optical beam such that it is incident upon and is reflected by a selected one of said reflector elements, said reflector elements comprise a first plurality of reflector elements arranged at first respectively different separation distances and spatial orientations from said scanning reflector device, and a second plurality of reflector elements spaced apart from said first plurality of reflector elements and arranged at second separation distances and having second different spatial orientations from said scanning reflector device, so that as said scanning reflector device displaces said optical beam, said optical beam is reflected thereby along a path that intersects a selected one of said first plurality of reflector elements, a selected one of said second plurality of reflector elements, and is returned to and reflected by said scanning reflector device, and wherein said scanning reflector device comprises a rotary actuator scanner having a double reflecting scanning mirror.

6. A method of controlling the beam width of an optical beam comprising the steps of:

(a) directing said optical beam along a path that intersects a focusing device having a prescribed focal length; and (b) causing relative displacement between said optical beam and a selected one of a plurality of reflector positions at which a reflector element may be provided, respective ones of said plurality of reflector positions being located at respectively different separation distances from said focusing device, so as to cause said optical beam to be reflected from a reflector element provided at said selected one of said plurality of reflector positions, whereby, in the course of traveling along said path, said optical beam is incident upon said focusing device and said reflector element so as to be directed thereby to a given spatial location along said path, with said beam having a resultant beam width that is dependent upon the separation distance between said selected one of said plurality of reflector positions and said focusing device, and wherein said step (b) comprises causing linear displacement of said reflector element along the path of said optical beam to said selected one of said plurality of reflector positions, so as to cause said optical beam to be reflected from said reflector element and impinge upon said focusing device.

7. A method according to claim 6, wherein said step (a) comprises directing said optical beam through a polarizing beam-splitter and quarter wave retarding device prior to being incident upon said focusing device.

8. A method according to claim 7, wherein said step (b) comprises causing said optical beam, after being reflected from said selected reflector element, to be again directed upon said focusing device and pass through said polarizing beam-splitter and quarter wave retarding device.

9. An apparatus for controlling the beam width of an optical beam comprising a focusing device having a prescribed focal length, and a beam displacement control device which is operative to cause relative displacement between said optical beam and a selected one of a plurality of reflector element positions, respective ones of said plurality of reflector positions being located at respectively different separation distances from said focusing device, so as to cause said optical beam to be reflected from a reflector element provided at said selected one of said plurality of reflector positions, whereby, in the course of traveling along an optical beam path, said optical beam being incident upon said focusing device and said reflector element so as to be directed thereby to a given spatial location along said path, so that said beam has a resultant beam width that is dependent upon the separation distance between said selected one of said plurality of reflector element positions and said focusing devices, and further including a plurality of reflector elements at respectively different separation distances and spatial orientations, and wherein said beam displacement control device comprises a scanning reflector device that is spaced apart along said path from said focusing element, and wherein said scanning reflector device is operative to scan said optical beam such that it is incident upon and is reflected by said selected one of said reflector elements, and wherein said reflector elements comprise retro-reflector elements, so that, as said scanning reflector device scans said optical beam to be incident upon and reflected by said selected one of said retro-reflector elements, said optical beam is returned to and reflected by said scanning reflector device to said focusing device.

10. An apparatus for controlling the beam width of an optical beam comprising a focusing device having a prescribed focal length, and a beam displacement control device which is operative to cause relative displacement between said optical beam and a selected one of a plurality of reflector element positions, respective ones of said plurality of reflector positions being located at respectively different separation distances from said focusing device, so as to cause said optical beam to be reflected from a reflector element provided at said selected one of said plurality of reflector positions, whereby, in the course of traveling along an optical beam path, said optical beam being incident upon said focusing device and said reflector element so as to be directed thereby to a given spatial location along said path, so that said beam has a resultant beam width that is dependent upon the separation distance between said selected one of said plurality of reflector element positions and said focusing device, and wherein said optical beam displacement device comprises a scanning reflector device that is operative to cause said optical beam, after being reflected from said selected reflector element, to be again directed upon said focusing device and pass through a polarizing beam-splitter and a quarter wave retarding device.

11. An apparatus for controlling the beam width of an optical beam comprising a focusing device having a prescribed focal length, and a beam displacement control device which is operative to cause relative displacement between said optical beam and a selected one of a plurality of reflector element positions, respective ones of said plurality of reflector positions being located at respectively different separation distances from said focusing device, so as to cause said optical beam to be reflected from a reflector element provided at said selected one of said plurality of reflector positions, whereby, in the course of traveling along an optical beam path said optical beam being incident upon said focusing device and said reflector element so as to be directed thereby to a given spatial location along said path, so that said beam has a resultant beam width that is dependent upon the separation distance between said selected one of said plurality of reflector element positions and said focusing device, and further including a plurality of reflector elements at respectively different separation distances and spatial orientations, and, wherein said beam displacement control device comprises a scanning reflector device that is spaced apart along said path from said focusing element, and wherein said scanning reflector device is operative to scan said optical beam such that it is incident upon and is reflected by said selected one of said reflector elements, and wherein said reflector elements comprise a first plurality of reflector elements arranged at first respectively different separation distances and spatial orientations from said scanning reflector device, and a second plurality of reflector elements spaced apart from said first plurality of reflector elements and arranged at second separation distances and having second different spatial orientations from said scanning reflector device, so that as said scanning reflector device displaces said optical beam, said optical beam is reflected thereby along a path that intersects a selected one of said first plurality of reflector elements, a selected one of said second plurality of reflector elements, and is returned to and reflected by said scanning reflector device, and wherein said optical beam passes along a path that through a first focusing lens, and wherein said scanning reflector device is operative to cause said optical beam to impinge upon a focusing reflector element.

12. An apparatus for controlling the beam width of an optical beam comprising a focusing device having a prescribed focal length, and a beam displacement control device which is operative to cause relative displacement between said optical beam and a selected one of a plurality of reflector element positions, respective ones of said plurality of reflector positions being located at respectively different separation distances from said focusing device, so as to cause said optical beam to be reflected from a reflector element provided at said selected one of said plurality of reflector positions, whereby, in the course of traveling along an optical beam path, said optical beam being incident upon said focusing device and said reflector element so as to be directed thereby to a given spatial location along said path, so that said beam has a resultant beam width that is dependent upon the separation distance between said selected one of said plurality of reflector element positions and said focusing device, and further including a plurality of reflector elements at respectively different separation distances and spatial orientations, and wherein said beam displacement control device comprises a scanning reflector device that is spaced apart along said path from said focusing element, and wherein said scanning reflector device is operative to scan said optical beam such that it is incident. Upon and is reflected by said selected one of said reflector elements, and wherein said reflector elements comprise a first plurality of reflector elements arranged at first respectively different separation distances and spatial orientations from said scanning reflector device, and a second plurality of reflector elements spaced apart from said first plurality of reflector elements and arranged at second separation distances and having second different spatial orientations from said scanning reflector device, so that as said scanning reflector device displaces said optical beam, said optical beam is reflected thereby along a path that intersects a selected one of said first plurality of reflector elements, a selected one of said second plurality of reflector elements, and is returned to and reflected by said scanning reflector device, and wherein said optical beam passes along a path that through a first focusing lens, and further including a focusing lens located optically downstream of said selected reflector element, said selected reflector element being a focusing reflector element, and wherein said scanning reflector device is operative to cause said optical beam to impinge upon said focusing reflector element and reflected thereby to become incident upon said focusing lens.

13. An apparatus for controlling the beam width of an optical beam comprising a focusing device having a prescribed focal length, and a beam displacement control device which is operative to cause relative displacement between said optical beam and a selected one of a plurality of reflector element positions, respective ones of said plurality of reflector positions being located at respectively different separation distances from said focusing device, so as to cause said optical beam to be reflected from a reflector element provided at said selected one of said plurality of reflector positions, whereby, in the course of traveling along an optical beam path, said optical beam being incident upon said focusing device and said reflector element so as to be directed thereby to a given spatial location along said path, so that said beam has a resultant beam width that is dependent upon the separation distance between said selected one of said plurality of reflector element positions and said focusing device, and further including a plurality of reflector elements at respectively different separation distances and spatial orientations, and wherein said beam displacement control device comprises a scanning reflector device that is spaced apart along said path from said focusing element, and wherein said scanning reflector device is operative to scan said optical beam such that it is incident upon and is reflected by said selected one of said reflector elements, and wherein said reflector elements comprise a first plurality of reflector elements arranged at first respectively different separation distances and spatial orientations from said scanning reflector device, and a second plurality of reflector elements spaced apart from said first plurality of reflector elements and arranged at second separation distances and having second different spatial orientations from said scanning reflector device, so that as said scanning reflector device displaces said optical beam, said optical beam is reflected thereby along a path that intersects a selected one of said first plurality of reflector elements, a selected one of said second plurality of reflector elements, and is returned to and reflected by said scanning reflector device, and wherein said scanning reflector device comprises a rotary actuator scanner having a double reflecting scanning mirror.

14. An apparatus for controlling the beam width of an optical beam comprising a focusing device having a prescribed focal length, and a beam displacement control device which is operative to cause relative displacement between said optical beam and a selected one of said plurality of reflector element positions, respective ones of said plurality of reflector positions being located at respectively different separation distances from said focusing device, so as to cause said optical beam to be reflected from a reflector element provided at said selected one of said plurality of reflector positions, whereby, in the course of traveling along an optical beam path, said optical beam being incident upon said focusing device and said reflector element so as to be directed thereby to a given spatial location along said path, so that said beam has a resultant beam width that is dependent upon the separation distance between said selected one of said plurality of reflector element positions and said focusing device, and wherein said beam displacement control device includes a linear actuator which is operative to cause linear displacement of said reflector element along the path of said optical beam to said selected one of said plurality of reflector positions, so as to cause said optical beam to be reflected from said reflector element and impinge upon said focusing device.

15. An apparatus according to claim 14, further including a polarizing beam-splitter and quarter wave retarding device through which said beam passes prior to being incident upon said focusing device.

16. An apparatus according to claim 15, wherein said linear actuator which is operative to cause said optical beam, after being reflected from said selected reflector element, to be again directed upon said focusing device and pass through said polarizing beam-splitter and quarter wave retarding device.

17. A laser beam scanning apparatus comprising a laser source which outputs a collimated laser beam, a device for controlling the beam width of said laser beam comprising a focusing device having a prescribed focal length, and a beam displacement control device which is operative to cause relative displacement between said laser beam and a selected one of said plurality of reflector element positions, respective ones of said plurality of reflector positions being located at respectively different separation distances from said focusing device, so as to cause said laser beam to be reflected from a reflector element provided at said selected one of said plurality of reflector positions, whereby, in the course of traveling along an laser beam path, said laser beam being incident upon said focusing device and said reflector element so as to be directed thereby to a given spatial location along said path, so that said laser beam has a resultant laser beam width that is dependent upon the separation distance between said selected one of said plurality of reflector element positions and said focusing device, and a multidimensional scanner which scans said resultant laser beam across an imaging surface, and wherein said beam displacement control device includes a linear actuator which is operative to cause linear displacement of said reflector element along the path of said laser beam to said selected one of said plurality of reflector positions, so as to cause said laser beam to be reflected from said reflector element and impinge upon said focusing device.

* * * * *